3,253,634
PNEUMATIC TIRE
Bruce R. De Young, Akron, Ohio, assignor to The Goodyear Tire & Rubber Company, Akron, Ohio, a corporation of Ohio
Filed Feb. 19, 1964, Ser. No. 346,007
2 Claims. (Cl. 152—353)

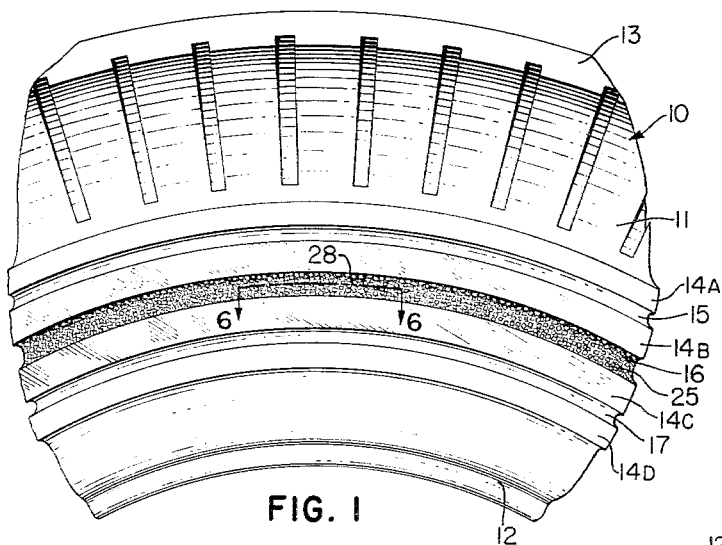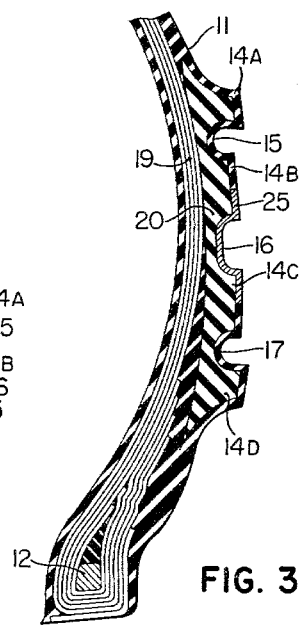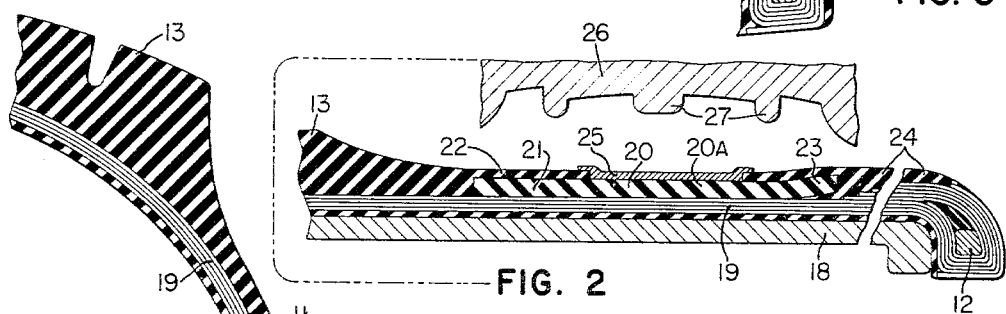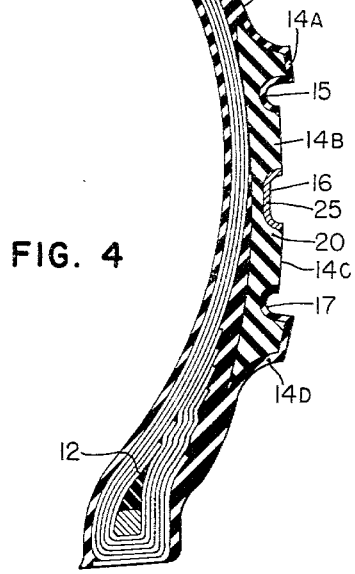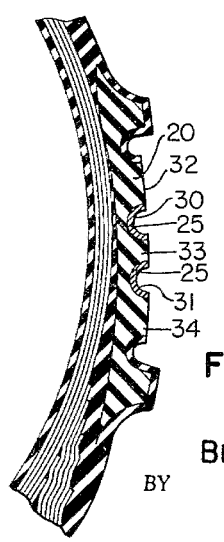
INVENTOR.
BRUCE R. DE YOUNG
BY
J.B. Holden
ATTORNEY United States Patent Office 3,253,634
Patented May 31, 1966

This invention relates to a tire with novel decorative sidewalls having an area thereof made of light-reflective spangles or glitters.

An object of this invention is to provide a decorative sidewall for tires having an area of the sidewall which not only contrasts in color with the remainder of the tire, but includes light-reflective spangles or glitters.

A further object of the invention is to provide a sidewall of a tire with a layer of substantially transparent elastomeric material having physical properties substantially equal to the remainder of the sidewall in which is embedded a plurality of glitters or spangles to provide an unusually striking and smart appearing tire sidewall.

Further objects and advantages of the invention will become apparent when the specification is read in conjunction with the accompanying drawings, in which FIG. 1 is a side elevational view of a tire employing the invention;

FIG. 2 is a cross-sectional view, with parts broken away, of a green tire layup and a portion of the mold of the tire of this invention;

FIG. 3 is a partial cross-sectional view of the cured tire immediately subsequent to cure;

FIG. 4 is a partial cross-sectional view of the completed cured tire;

FIG. 5 is a view similar to FIG. 4 showing a modification of the invention;

FIG. 6 is a partial enlarged sectional view taken along the lines 6—6 of FIG. 1.

Referring to the drawings, the tire 10 comprises the usual sidewalls 11, bead portion 12, and tread portion 13. The sidewall 11 includes one or more ribs 14A, 14B, 14C and 14D extending circumferentially of the tire sidewall, and defined by intervening grooves 15, 16, and 17.

As shown in FIG. 2 of the drawings, the tire is formed on a building drum 18 with the usual carcass plies 19, bear 12, and tread 13. At least one of the sidewalls 11 includes a layer 20 of white or colored stock other than black stock secured to the sidewall and overlapped along one edge 21 by the skirt 22 of the tread, and at the other edge 23 by a strip of rubber 24 extending toward the bead 12 of the tire. The central portion 20A of the layer 20 is covered by a strip of elastomeric material 25. After the tire has been completely built on the drum 18, the green tire is removed therefrom and cured in a suitable mold 26 having a plurality of circumferentially spaced ribs 27 which form the respective circumferential grooves in the tire. The cured tire, as shown in FIG. 3, is completed by buffing the surfaces of the ribs 14B and 14C to expose the underlying white stock layer 20, as shown in FIG. 4 of the drawings. Thus, the completed tire, as shown in FIG. 4, includes a pair of white ribs 14B and 14C, a pair of black grooves 15 and 17, and an intervening groove 16 between the white ribs.

The elastomeric strip 25 lining the bottom and sidewalls of the groove 16 is made of a substantially transparent elastomeric material and, as shown in FIGS. 1 and 6, includes a multiplicity of light-reflective spangles or glitters 28 contrasting in color with the white and black portions of the tire. The spangles 28 are formed of thin sheet metal of one thousandth to several thousandths of an inch in thickness and with the dimensions of the parallel faces 29 of the spangles 28 being from about 1/64" to 1/16". As shown in FIG. 6, each of the spangles 28 is embedded in the transparent elastomeric strip 25 so that the faces 29 are predominately orientated in a direction substantially parallel to the outer face of the strip 25. In the completed tire, the exposed faces 29 of the spangles are visible through the substantially transparent or highly translucent elastomeric strip 25. Since the spangles are orientated substantially parallel to the surface of the strip 25, the spangles or flakes 28 in the completed tire glitter or sparkle as light is reflected from the individual spangles in slightly different directions.

Layer 25 is made from a neoprene or a sulfur-curable polyurethane green rubber, which is compounded without carbon black or other reinforcing agents that render the stock opaque. An example of a suitable formulation is as follows.

Ingredients: Parts by wt.
Polyurethane gum _____ 100.00
Hydrated silica _____ 15.00
Cadmium stearate _____ 0.50
Mercaptobenzothiazole _____ 2.00
Mercaptobenzothiazole disulfide _____ 4.00
Sulfur _____ 2.00

In some instances, a tiegum or adhesive may be used to secure layer 25 to the underlying white stock 20 when the stocks are in the uncured state. Such tiegum or adhesive may be of any conventional formulation, such as shown in U.S. Patent 2,749,960. For example, the adhesive may comprise a 10 to 15 percent toluene solution of a natural rubber tread stock to which is added one part of polyphenyl isocyanate to five parts of the rubber solution.

FIG. 5 of the drawings is a modification of the invention in which a pair of radially spaced grooves 30 and 31 are each lined with a layer of light-reflective stock 25 and the adjacent ribs 32, 33, and 34 are each formed of white sidewall stock 20. The grooves and ribs extend circumferentially of the tire.

Although the invention has been shown and described in a preferred form of grooves or recesses extending continuously in a circumferential direction of the sidewall, it is to be understood that the invention is not so limited. The grooves or recesses which are lined with the layer of light-reflective stock 25 may be a variety of configurations. For example, the grooves or recesses may consist of a series of short depressions aligned circumferentially; or a series of short radially extending depressions; or isolated spaced aligned depressions.

While certain representative embodiments and details have been shown for the purpose of illustrating the invention, it will be apparent to those skilled in this art that various changes and modifications may be made therein without departing from the spirit or scope of the invention.

What is claimed is:
1. A pneumatic tire including a generally toroidal shaped carcass, spaced beads having rubber sidewalls and a rubber tread, at least one of said sidewalls having a plurality of circumferentially extending grooves and having a layer of substantially transparent elastomer secured in at least one groove therein, said layer having spangles of light-reflective metal dispersed in said layer, said spangles having a color contrasting with the color of the rubber in the remainder of said sidewall, said spangles having faces which are predominately oriented so that said faces are substantially parallel to the surface of said layer.

2. A tire as claimed in claim 1 in which a rib of white rubber is positioned adjacent each edge of said groove.

References Cited by the Examiner

UNITED STATES PATENTS

| | | | |
|---|---|---|---|
| 1,175,624 | 3/1916 | Fawkes | 152—211 |
| 2,566,329 | 9/1951 | Hessney et al. | |
| 2,761,489 | 9/1956 | Kraft | 152—353 X |
| 2,902,072 | 9/1959 | Reuter | 152—313 X |
| 2,931,736 | 4/1960 | Park | 117—9 |

FOREIGN PATENTS 460,557  1/1937  Holland.

ARTHUR L. LA POINT, *Primary Examiner.*

C. W. HAEFELE, *Assistant Examiner.*